A. FAY.
APPARATUS FOR OPERATING UPON COMPOSITE SUBSTANCES.
APPLICATION FILED MAR. 1, 1915.
1,210,781.
Patented Jan. 2, 1917.
5 SHEETS—SHEET 1.
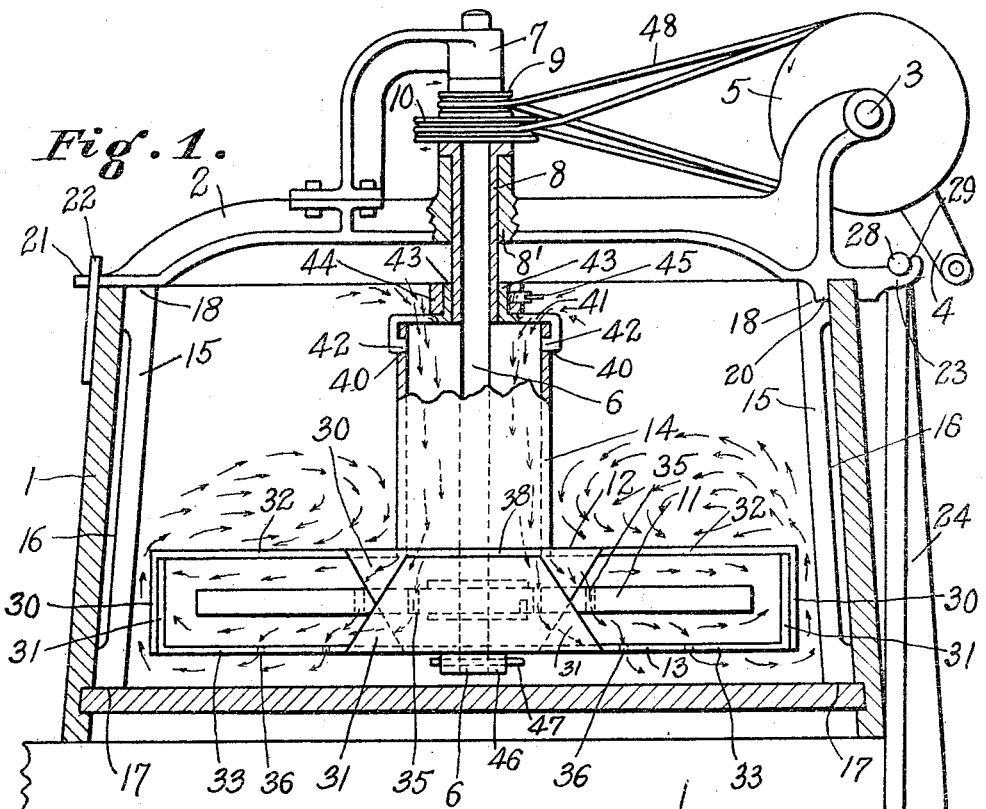
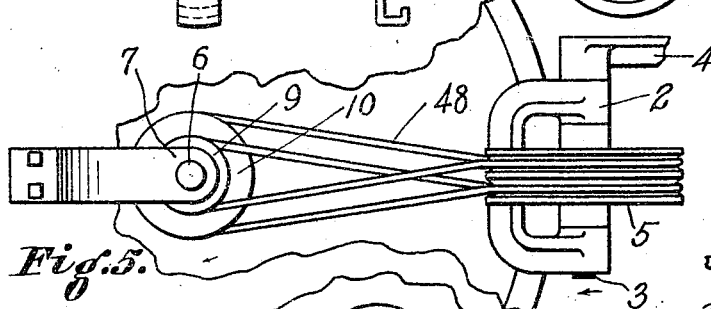
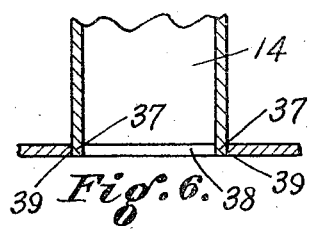
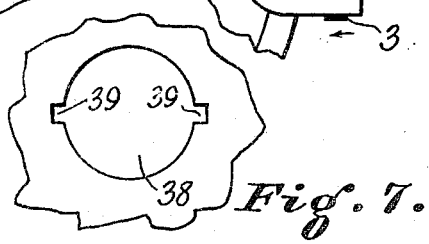
WITNESSES:
INVENTOR.

A. FAY.
APPARATUS FOR OPERATING UPON COMPOSITE SUBSTANCES.
APPLICATION FILED MAR. 1, 1915.

1,210,781.

Patented Jan. 2, 1917.
5 SHEETS—SHEET 2.

WITNESSES:
Carl E. Johnson
H. Johnson

INVENTOR.
Alpheus Fay

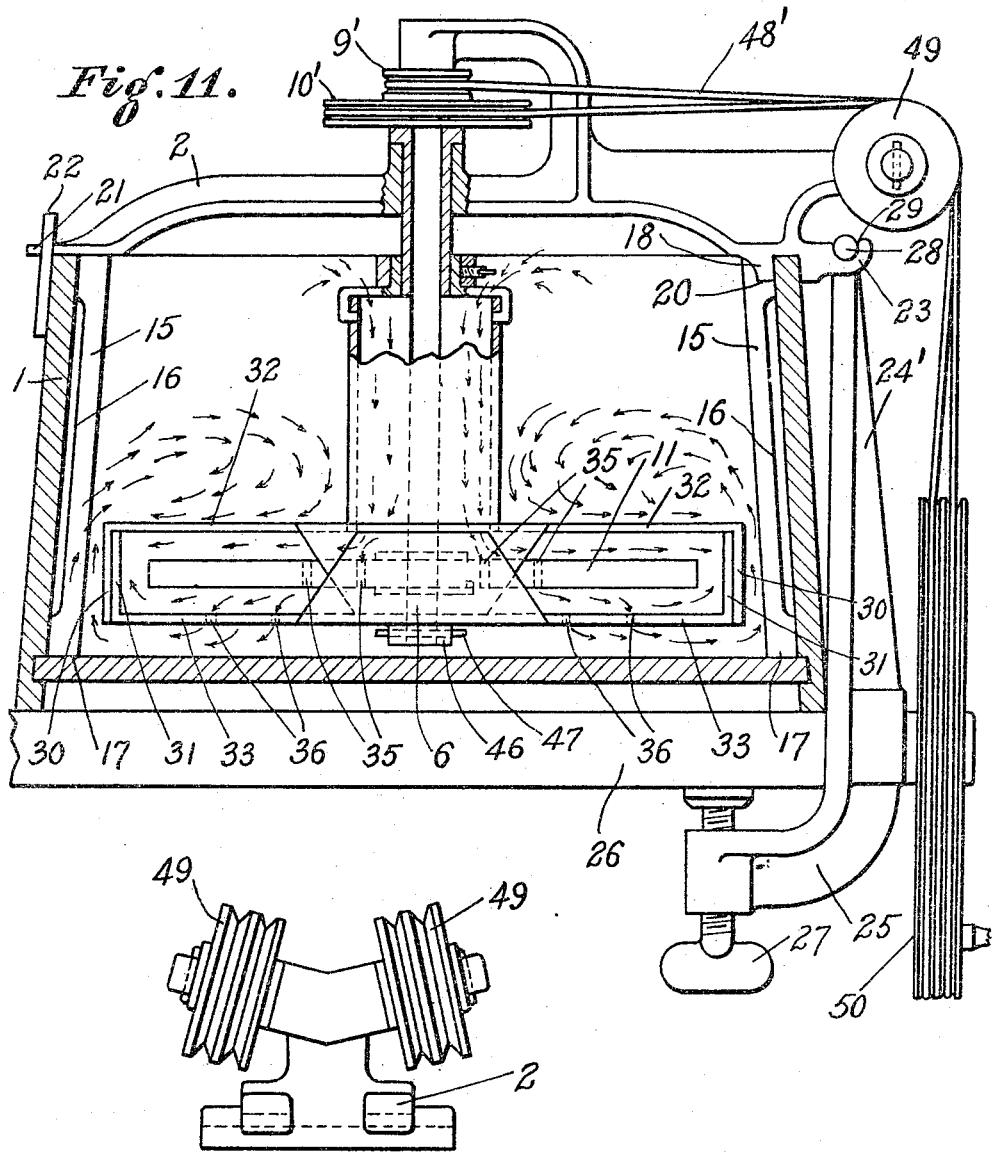

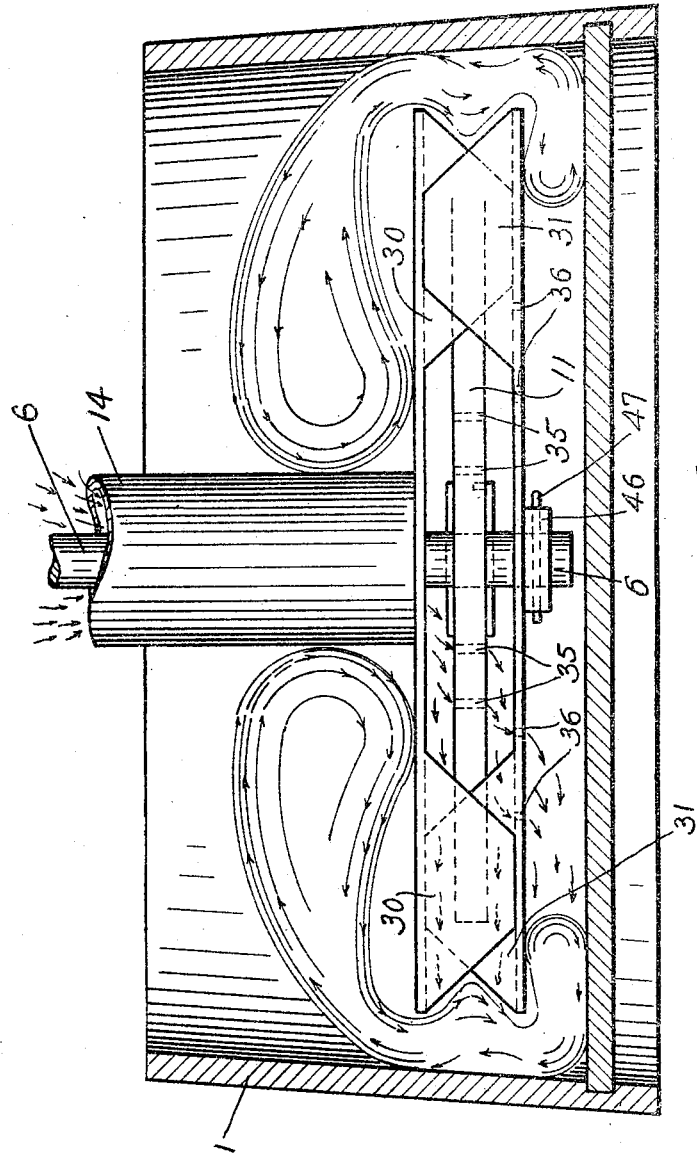

UNITED STATES PATENT OFFICE.

ALPHEUS FAY, OF LOUISVILLE, KENTUCKY.

APPARATUS FOR OPERATING UPON COMPOSITE SUBSTANCES.

1,210,781. Specification of Letters Patent. Patented Jan. 2, 1917.

Application filed March 1, 1915. Serial No. 11,354.

*To all whom it may concern:*

Be it known that I, ALPHEUS FAY, a citizen of the United States, and a resident of Louisville, in the county of Jefferson and State of Kentucky, have invented a certain new and useful Apparatus for Operating upon Composite Substances, of which the following is a specification.

My invention relates to a novel apparatus operating centrifugally upon a substance, and the object is to provide means for operating upon substances such as milk elements in such a manner that the proportion of vertical pressure and of the impact within the body of liquid and the consequent disruptive agitation are minimized and the proportion of aeration, centrifugal and centripetal action therein are maximized by virtue of operating in a body of substance with its depth minimized and its diameter maximized, equally distributing all of the forces to operate uniformly throughout the body of substance at a greater altitude of development.

Another object is to provide a device of this character of simplified and inexpensive construction, so arranged that the milk elements will be treated with facility, reducing the time and labor of operation as well as making it more convenient to place the apparatus in condition for operation and to take it apart after the operation is complete and keep it clean and sanitary.

My invention consists in the apparatus and the parts thereof and in the details of construction and arrangement of such parts as will hereinafter be more fully described and claimed.

Figure 8:
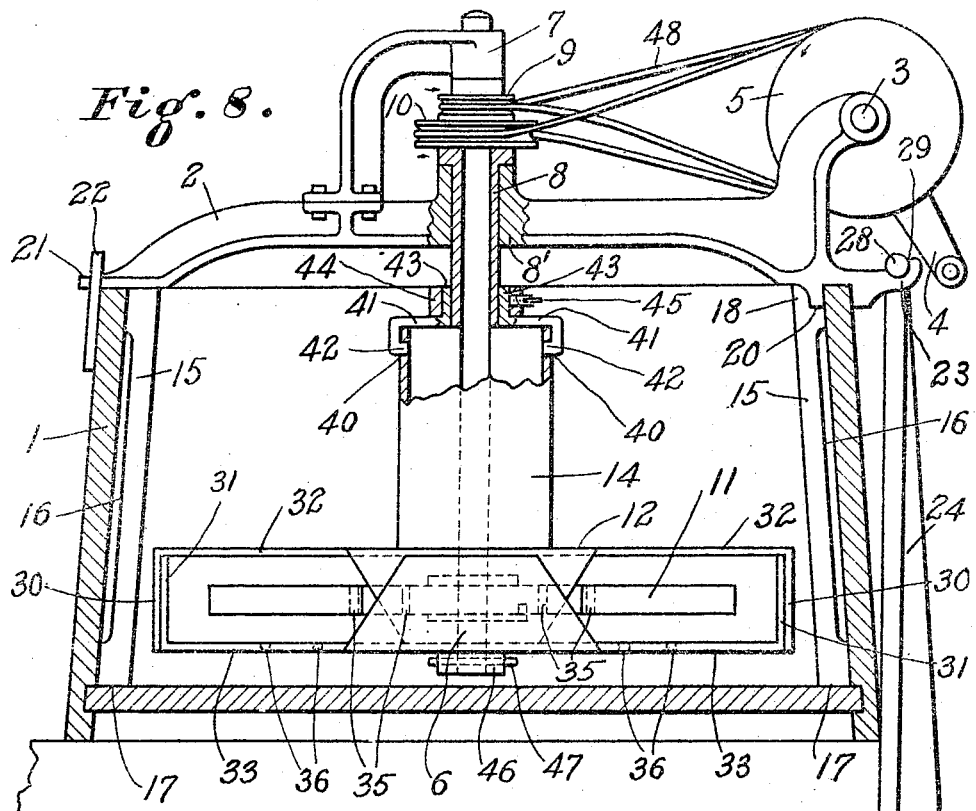
Figure 9:
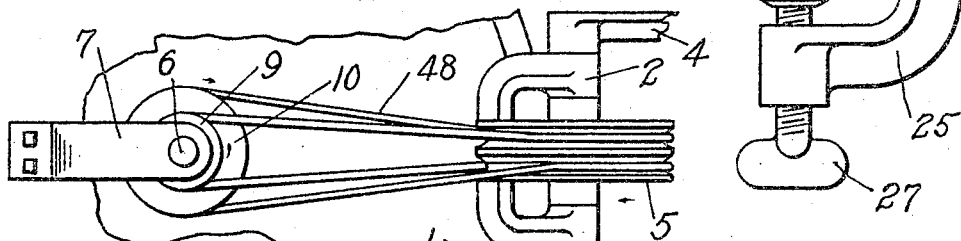
Figure 10:
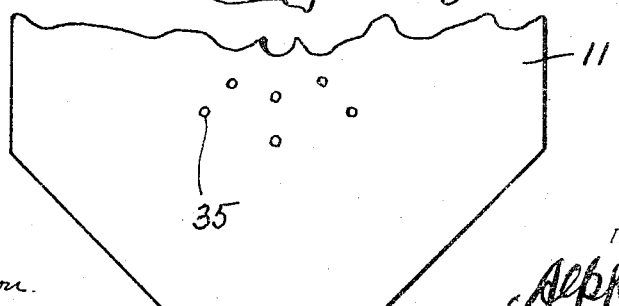
Figure 13:
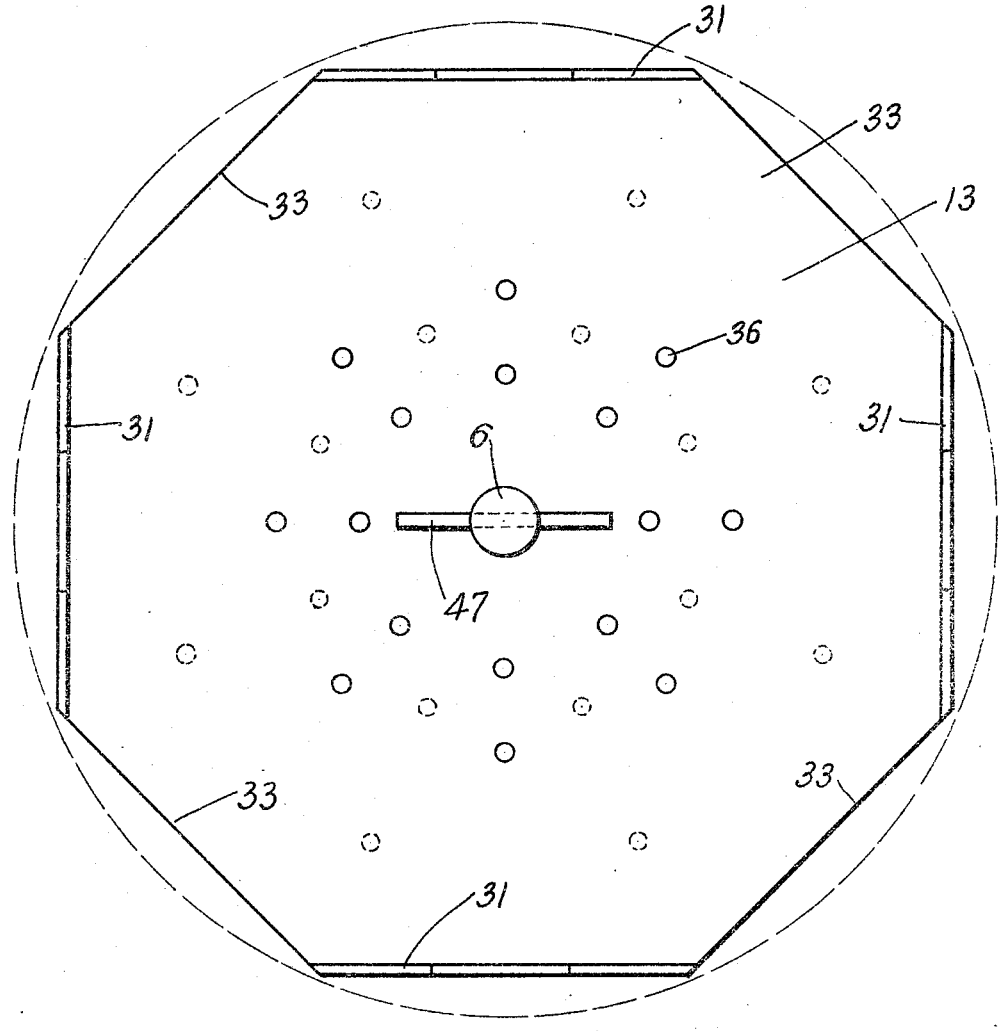

In the drawings: Figure 1 is a sectional elevation of an apparatus embodying my invention. Fig. 2 is a detail plan view of part of the gripping means for the upper end of the tubular shaft. Fig. 3 is a side elevation of the same. Fig. 4 is an inverted plan view of the tubular shaft. Fig. 5 is a partial plan view of the apparatus as shown in Fig. 1, in which the belt is shown arranged for driving both of the impellers in the same direction but at different speeds. Fig. 6 is a partial section of the outside impeller and the lower part of the tubular shaft showing how it is connected thereto. Fig. 7 is a partial plan view of the outside impeller. Fig. 8 is a view similar to Fig. 1, but showing the belt arranged for driving the impellers in opposite directions at different speeds. Fig. 9 is a partial plan view of the apparatus with the belts arranged as shown in Fig. 8. Fig. 10 is a partial plan view of the inside impeller showing it octagonal in shape. Fig. 11 is a sectional elevation of a modification of the apparatus in which the inside impeller is circular, and also showing a modification of the driving means in which the driving wheel is located on the lower part of the device with idler pulleys for the belt to pass over from the driving wheel to the impeller pulleys. Fig. 12 is a detail side elevation of the idler pulleys. Fig. 13 is a detail plan view of the outside impeller and also showing the inside impeller in dotted lines, and of circular shape, as in the example of Fig. 11 the outer broken circle showing the apparent disposition of the liquid when the impeller is rotated at high speed. Fig. 14 is a sectional elevation similar to Figs. 1, 8 and 11, and giving a view of the impellers at another angle to better illustrate the direction of the air and liquid currents set up by the operation of the impellers, the directions of these currents being indicated by the lines and arrow-heads.

The vessel 1 for containing the milk elements to be operated upon is of wide and low formation providing an ample base so that the vessel is readily secured in a permanent manner to a table or other supporting means; it also prevents the substance to be operated upon from becoming deep in proportion to its diameter. Keeping the depth of a substance shallow in proportion to its diameter is a very important feature in the satisfactory operation of my apparatus, and for that reason I make my vessel for containing the substance to be operated upon of a wide and low formation, namely, the diameter being greater than its depth.

The bracket 2 is mounted across the top of the vessel and secured to the rim thereof as will be more particularly described hereinafter. And shaft 3 is journaled horizontally in the bracket, transversely thereof, at one side of the vessel, and has a crank 4 fixed on it. A driving wheel 5 is fixed on this shaft between bearings of the shaft in the bracket, and the vertical shaft 6 is journaled in the bracket 2 in an upper bearing 7 and extends through a hollow shaft 8 which is journaled in a lower bearing 8′ in the bracket 2. A small pulley 9 is fixed on the shaft 6 adjacent to the upper bearing 7 and a larger pulley 10 is fixed on the wheel shaft 8, which wheel shaft 8 has a shoulder bearing against the upper side of the bearing 8'.

The shaft 6 extends down into the vessel 1 and across an inner impeller 11 in the form of a plane disk, which, as shown in Figs. 1 and 11, is circular, while an outer impeller composed of plane polygonal members 12 and 13 has a hollow shaft 14 surrounding the shaft 6, and entirely surrounds the inner impeller 11. These agitator members and the means for securing their tubular shaft 14 to the wheel shaft 8 will be more fully described hereinafter. To properly coöperate with these impellers brakes 15 are mounted in upright positions against the opposite walls of the vessel 1, being preferably of wood, with their sides 16 cut away next to the walls and with their lower ends 17 square and held down against the bottom of the vessel by having their upper ends 18 fixed firmly in sockets in the lower side of the bracket 2 where the bracket bears on the rim of the vessel at each end.

The bracket 2 has at the end where the driving wheel 5 is a transverse part 20 with its lower side of channeled formation to fit snugly on the rim of the vessel and support the bracket at that end, while the other end, 21, of the bracket is simply in the form of a flat shank, which slips under a cleat 22 secured to the upper side of the rim of the vessel. And extending out from the end that has a journaled formation is a fork 23 and an arm 24 extends up from a terminal part 25 that projects up under the table or other object 26 upon which the vessel is to be supported, this terminal part having a clamp screw 27 to bear against the lower side of said object 26, and the upper end of the arm 24 has opposite transverse lugs 28 that engage in upwardly presented recesses 29 in the members of the fork 23 with said upper part of the arm 24 lying between said members, so that interlocking engagement is made between the arm 24 and the bracket 2. By this means when the arm is clamped tightly to the table it holds the bracket 2 firmly on the vessel 1 and holds the entire apparatus firmly down on the supporting object 26.

Each of the agitator parts 12 and 13 is composed of a square sheet of metal, and with its corners bent down or up as the case may be, so that the complete member is octagonal, with triangular sides 30 and 31, respectively, alternating with open sides 32 and 33, respectively. These members thus formed are inversely assembled and preferably as shown each member has two opposite octagonal sides outside the engaging octagonal side of the other member. This involves the forming of the two opposite sides on each member at different distances apart, but it permits the two members to be formed alike and simply rotated with respect to each other a quarter revolution to have them come together as above noted. If all the sides of one member were made to engage all the sides of the other member, the two members could not be formed alike as regards these octagonal sides. In addition, the assembled agitator is made more symmetrical and is adapted to operate better upon liquid due to its symmetrical formation.

The inside impeller 11 preferably has holes 35 through it, from its upper to its lower side, and the lower member 13 of the outside agitator also preferably has holes 36 down through it, preferably located farther outward than are the holes 35 in the inside impeller 11.

The tubular shaft 14 has downward extending lugs 37 on its lower end, and the upper member 12 of the outside impeller has a central aperture 38 at opposite sides of which are notches 39, in which the lugs 37 engage and aline the tubular shaft 14 with the aperture as well as causing the entire impeller, made up of the members 12 and 13, to rotate with the tubular shaft 14. Near the upper end of the tubular shaft 14 it has a recess 40 in its walls at opposite sides, and two clips 41 have lugs 42 in these recesses 40 and then extend up and inward where each of them has a part 43 extending partly around the lower end part of the hollow shaft 8, while coming down around these parts 43 is a clamping collar 44 with a set screw 45 by means of which it clamps the parts 43 of the two clips 41 tightly to the wheel shaft 8, thus causing the tubular shaft 14 to rotate with the wheel shaft 8 as well as holding the tubular shaft down tight upon the upper impeller member 12. Beneath the lower impeller member 13 is a collar 46 fitting on the lower end of the shaft 6, and a pin 47 passing through the collar and the shaft 6 holds this lower impeller upward against the upper impeller 12, as well as allows it to turn with the shaft 8.

The shafts 6 and 8 are rotated by the driving wheel 5 through the medium of a flexible belt 48, which has two distinct grooves in its periphery for this purpose. Then each one of the strands passes around one of the pulleys 9 and 10 on the shafts 6 and 8 respectively. As shown in Figs. 1 and 2 the strands that pass to the top of the driving wheel 5, pass to the same sides of their respective pulleys 9 and 10, so that both impellers are driven in the same direction, but the pulley 9 being so much smaller than the pulley 10, the inner impeller is driven at much higher speed than is the outer impeller. As shown in Figs. 8 and 9 the strands are passing in opposite directions around the pulleys 9 and 10, causing the impellers to rotate in opposite directions and, due to the difference in the size of the pulleys, at different speeds.

In the modification shown in Fig. 11 the driving wheel 5 is replaced by a pair of idler pulleys 49, each having two grooves in its periphery, and a larger driving wheel 50 is rotatably mounted on the arm 24' in its lower part near where it extends under the supporting object 26. Somewhat larger pulleys 9' and 10' replace the pulleys 9 and 10, and a belt 48' has two strands passing around two grooves in the periphery of the driving wheel 50, while each one of the strands passes around a respective pulley 9' and 10' and over one of the idler pulleys 49. Thus the impellers may be driven at different speeds by the large driving wheel, and if one of the strands of the belt 48'' is reversed around one of the pulleys one of the impellers will be driven in opposite direction in the same manner as illustrated in Figs. 8 and 9. In any of these examples the employment of a relatively small belt with a plurality of strands secures greater efficiency in operation, due to the greater proportion of the smaller strands as well as the increased frictional area of engagement of the belts over that which a single strand of equal strength would have.

In any of the examples, when the impellers are rotated the liquid in contact with the upper and lower surfaces of the upper and lower members 12 and 13 of the outer impeller is thrown horizontally along the surfaces outward in every direction, and is also thrown away from the diagonal sides of the members, as indicated in Figs. 13 and 14. The wall of the liquid around the periphery of the impelling members is of a V-shape serpentine formation. The centrifugal action along the plane surfaces of the members will cause a reduction of pressure of the liquid in the central region around the shaft 6 inside the tubular shaft 14 as well as outside the tubular shaft 14, with the result that atmospheric air under atmospheric pressure will pass downward into the liquid in such central regions until it reaches the upper surfaces of the members where it will be carried outward along with the liquid that is being thrown outward by this centrifugal action. The holes 36 in the lower member 13 will allow the passage of some of the air below this lower member to the space between it and the bottom of the vessel. In addition to this, the inside impeller rotating at a relatively slow speed, and also acting centrifugally upon the liquid, will produce a much increased inflow of air down toward the tubular shaft 14, and having the openings 35, some of this air will pass below the inner impeller 11 between it and the lower impeller member 13. Where the inner impeller member is also made polygonal, as shown in Figs. 8 and 10, its action will be somewhat similar to that of the outer impeller.

The frictional centrifugal action of the lower surface of the lower member serves to keep the region between this member and the bottom of the vessel clear of the solid matter that collects as a result of the operation; as for instance the action of the butter particles in separating butter from the other milk elements.

The liquid thrown out by the lower surfaces of the members 12 and 13 and of the inner impeller 11 mingles in the regions around the peripheries of the members with the liquid thrown out by the upper surfaces of the members and inner impeller. Along with these currents of liquid are mingled the currents of air above and below said members and impeller. The tendency of these currents of liquid and air is upward adjacent to the walls of the vessel, and the brakes 15 will prevent simple whirling of the liquid in the vessel and so modify the direction of the liquid and air currents that a continuous smooth inflow and steady roll of the rarefied liquid will occur all around the vessel, as shown in Fig. 15.

Owing to the absence of impact by the impeller, the nature of the liquid and air currents will be such that their contact with the brakes will not result in any violent agitation. On the contrary, the application of the forces to the liquid and air is so steady and smooth that an extremely uniform distribution of the forces and air throughout the body of liquid is effected. This uniform action throughout the liquid is comparable to the uniform activity of a body of liquid undergoing a gentle boiling process caused by heat applied to the liquid. I have discovered that such a uniform distribution of the forces throughout a liquid produces true ebullition, without heat.

The result of operation according to my method is to produce the above described true ebullition; and as near as I have been able to determine, this true ebullition is the manifestation of a huge number of vibrations, the result of a huge number of distinct and minute currents of infinitesimal elements of energy very uniformly distributed throughout the body of milk or other liquid. These vibrations separate the butter or fatty elements causing the non-fatty elements to divide and go into minute suspension, or solution, with the water of the milk or other liquid; or else to remain in such minute suspension or solution in the water as they were in the original milk or other liquid; and causing the fatty elements to form into visible or palpable bodies in the form of crystals or granules of about the size and shape of coarse grains of salt.

On account of the exceedingly minute divisions of the distribution of the forces throughout the liquid body, and the uniformity of this distribution, these changes are harmoniously brought about in an exceedingly short space of time, as herein described. The wide difference between the nature of this operation and that of the ordinary churning or separating operation, either without aeration or with inferior and practically negligible aeration, is indicated by the great difference in time required to bring about these changes as regards my invention compared to other methods herein alluded to, as well as by the marked increase in purity of the product and the increase in proportion of fatty elements recovered, as will be more fully pointed out herein. Processes of separating butter from the other milk elements have always involved some kind of violent agitation; and, where aeration was resorted to, the means and methods employed were such that the aeration obtained was practically negligible owing to lack of uniform application. I minimize the agitation and the vertical pressure and maximize the aeration and centrifugal force so that the proper proportion of vertical pressure, aeration agitation, centrifugal and centripetal force is obtained, with the result that true ebullition is obtained without the application of heat.

Forcing air through a liquid by the action of a pump or blower has more the effect of mechanical agitation than it does of aeration, and cannot be described as true ebullition for this reason, also for the reason that the distribution of all the forces throughout the liquid will not be uniform. With my method, involving centrifugal and centripetal action without impact, the entrance of the air into the liquid is caused merely by the atmospheric pressure, and the action is such that the air entering under this pressure is brought into contact with practically every particle of the liquid during the operation. This, in conjunction with all the other forces acting uniformly on the liquid, produces true ebullition.

With the same volume of liquid placed in a deep vessel or a shallow vessel, the diameter of the shallow vessel being such liquid will be about half the depth of that in the deep vessel, the energy required to churn the cream is about one-fourth that in the shallow vessel to what would be required to do the same work in the deep vessel, and the result attained will be better, namely, better butter and more butter, than can be made in the deep body of the liquid. The butter which is made by revolving a disk in a shallow body of cream will not become rancid as soon as butter made in the ordinary way, because the small globules of butter fat have not been broken up and the other ingredients of the milk which cause butter to become rancid have been kept separated from butter-fat globules.

The friction of disks revolving in a liquid is directly proportional to the area of rubbing surface; the energy required is proportional to the resistance overcome. According to my method the liquid depth must be such that the force applied will be uniformly distributed throughout the entire body of liquid. When a disk revolves in a liquid that has its depth several times greater than its diameter the liquid immediately in contact with the disk, and for a very limited distance from the disk, may be affected; but the main body of the liquid will not be acted upon. In a shallow body of liquid, which has a diameter greater in proportion to its depth, the vertical pressure on the disk is slight, and all the liquid in turn being in true contact with the disk, the forces applied are utilized in the most efficient manner possible.

The peripheral speed of my disks is always the same, approximating about eleven hundred and fifty feet per minute. I have found by revolving disks in cream of different depths that the same disk revolving in shallow cream will produce more butter, better butter, and make it in less time.

In a shallow body of liquid, the energy applied through the disk to the liquid is equally distributed through the entire body; but in the deep body of liquid the forces are not equally distributed. Therefore the efficiency is less in the deep body of liquid and owing to the relation between the disk and the deep body of liquid it is impossible to ever attain the same efficiency in a deep body of liquid as in a shallow body by my process, and if the body of liquid is very deep in proportion to the diameter no perceptible effect would be had upon it.

In two vessels containing the same quantity of liquid, one having its height twice that of the other, and the shallow one having its diameter increased so that half the height will cause it to contain the same amount of liquid as the tall vessel, and my disk is revolved in the shallow body of liquid, the energy required to operate the disk of greater diameter will be about one-fourth that required to operate the disk of lesser diameter; the peripheral speed of the disks being the same. To operate my device at the greatest efficiency, the depth of the liquid must have the right relation to the diameter. For example, a vessel of 7" diameter and 12" high, inside measurement, would contain about 2 gals., and a vessel 9⅜" diameter and 6" high, inside measurement, will contain about two gallons. Now, if I place one of my disks 6" in diameter in the vessel which is 12" high and submerge it in a liquid within the vessel 6" from the top and place one of my disks 8⅜ diameter in a liquid within the vessel which is 6" high 3" from the top, and both disks are revolved so that the peripheral speed of each disk is the same, the energy required to operate the large disk would be about one quarter that for operating the small disk, and the results obtained would be far superior. This action, although familiar as obtained by the action of heat on a liquid, could not be utilized in the treating of milk elements to obtain butter were it necessary to apply heat to the liquid sufficient to boil.

For separating butter from either sweet or sour cream, the liquid is placed in the vessel with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting place for the butter separated from the upper liquid. On the other hand it is highly desirable that the impeller disk be of considerable diameter in order to obtain the greatest amount of centrifugal action without impact and to operate on as large a quantity of liquid as is desired. For this reason the proper disposition of the body of liquid will be such that its width is considerably greater than its depth, as illustrated in the drawing, and it is for this reason that the vessel is made wide and low so that it is possible for all the forces applied to the liquid to act upon it in a uniform manner. The milk elements should not have their temperature too low or too high, about 55 or 60 Fahrenheit being the preferred temperature. Such temperature is high enough to allow the operation to be performed quickly, and it is not so high as to cause the resulting butter granules to be too soft. With this method butter may be produced in from three to ten minutes. Perceptible accumulation of butter will practically all take place during the last 15 or 60 seconds of the operation. The butter will form in granules, and then the residue may be drawn off from the vessel and the granules salted by agitation and aeration of brine with the granules in the vessel. When the salting operation is complete, the butter granules may be removed from the brine in the vessel, or the brine may be withdrawn from the butter granules, and the granules then removed from the vessel, after which the granules are worked or pressed into consistency for use. The efficiency of operation is such that fully 90% of the butter fat of the milk or cream is removed, and butter of purity of over 99% is obtainable, of firm texture and natural flavor.

Applicant believes that he is the first inventor to discover and make manifest to humanity the functions of minute currents of infinitesimal elements of harmonic forces of energy producing huge numbers of harmonic vibrations, operating upon a composite substance in a container with its diameter greater than its depth with a rotatable polygonal member with its diameter greater than its thickness, minimizing the vertical pressure and the impact, and maximizing the aeration and the centrifugal and the centripetal action, operating upon a body of a composite substance with its diameter greater than its depth.

I have shown and described a plurality of operations that produces a useful and novel result at a greater altitude of developement.

What I claim and desire to secure by Letters Patent is:

1. In a device of the class described and in combination with a vessel, a rotary outer impeller located adjacent the bottom of said vessel and comprising two horizontally arranged members spaced apart from one another; an independent rotary inner impeller comprising a disk located within said outer impeller; a vertically arranged driving shaft operatively connected with said inner impeller, a tubular shaft surrounding and spaced apart from said driving shaft and operatively connected with said outer impeller, the upper end of said shaft being open to the atmosphere and the lower end thereof being in open communication with the interior of said outer impeller, and means for rotating said shafts respectively at different speeds.

2. In a device of the class described and in combination with a vessel, a rotary outer impeller located adjacent the bottom of said vessel and comprising two horizontally arranged members spaced apart from one another and the periphery of which impeller moves in close proximity with the wall of said vessel, a rotary inner impeller comprising a disk located within said outer impeller, a vertically arranged driving shaft operatively connected with said inner impeller, a tubular shaft surrounding and spaced apart from said driving shaft and operatively connected with said outer impeller, the upper end of said shaft being open to the atmosphere and the lower end thereof being in open communication with the interior of said outer impeller, and means for rotating said shafts.

3. In a device of the class described and in combination with a vessel, a rotary outer impeller located adjacent the bottom of said vessel and comprising two horizontally arranged members spaced apart from one another and the periphery of which impeller moves in close proximity with the wall of said vessel, and the lower of which members is provided with a plurality of holes, a rotary inner impeller comprising a disk located within said outer impeller, a vertically arranged driving shaft operatively connected with said inner impeller, a tubular shaft surrounding and spaced apart from said driving shaft and operatively connected with said outer impeller, the upper end of said shaft being open to the atmosphere and the lower end thereof being in open communication with the interior of said outer impeller, and means for rotating said shafts at different speeds.

4. In a device of the class described and in combination with a vessel, a rotary outer impeller located adjacent the bottom of said vessel and comprising two horizontally arranged members spaced apart from one another and the lower of which members is provided with a plurality of holes, a rotary inner impeller comprising a disk located within said outer impeller and provided with a plurality of holes, a vertically arranged driving shaft operatively connected with said inner impeller, a tubular shaft surrounding and spaced apart from said driving shaft and operatively connected with said outer impeller, the upper end of said shaft being open to the atmosphere and the lower end thereof being in open communication with the interior of said outer impeller, and means for rotating said shafts.

5. In a device of the class described and in combination with a vessel, a rotary outer impeller located adjacent the bottom of said vessel and comprising two horizontally arranged members spaced apart from one another, a rotary inner impeller comprising a disk located within said outer impeller, a vertically arranged driving shaft operatively connected with said inner impeller, a hollow driving shaft surrounding and in contact with the upper portion of said first mentioned shaft, means for rotating said shafts, a tubular shaft surrounding the lower portion of said first mentioned driving shaft and spaced apart therefrom, the upper end of said shaft being open to the atmosphere and the lower end thereof being in open communication with the interior of said outer impeller, means whereby the end of said tubular shaft is detachably connected with said outer impeller and means for detachably connecting the upper end of said tubular shaft with the lower end of said hollow driving shaft.

6. In a device of the class described and in combination with a vessel, a rotary outer impeller located adjacent the bottom of said vessel and comprising two horizontally arranged members spaced apart from one another, a rotary inner impeller comprising a disk located within said outer impeller, a vertically arranged driving shaft operatively connected with said inner impeller, a hollow driving shaft surrounding and moving in contact with the upper portion of said first mentioned shaft, means for rotating said shafts, a tubular shaft surrounding the lower portion of said first mentioned driving shaft and spaced apart therefrom, the upper end of said shaft being open to the atmosphere and the lower end thereof being in open communication with the interior of said outer impeller, lugs located at the lower end of said tubular shaft and adapted to engage and drive said outer impeller, clips located at the upper end of said tubular shaft and through which said shaft is driven and means whereby said clips are detachably connected with the lower end of said hollow driving shaft.

7. In a device of the class described and in combination with a vessel, a rotary outer impeller located adjacent the bottom of said vessel and comprising two horizontally arranged members spaced apart from one another, a rotary inner impeller comprising a disk located within said outer impeller, a vertically arranged driving shaft operatively connected with said inner impeller, a hollow driving shaft surrounding and moving in contact with the upper portion of said first mentioned shaft, means for rotating said shafts, a tubular shaft surrounding the lower portion of said first mentioned driving shaft and spaced apart therefrom, the upper end of said shaft being open to the atmosphere and the lower end thereof being in open communication with the interior of said outer impeller, lugs provided upon the lower end of said tubular shaft and adapted to engage recesses provided in the upper member of said outer impeller to thereby drive the same, two clips located at the upper end of said tubular shaft and having each a lug adapted to enter openings provided in said tubular shaft to thereby drive the same, and a collar surrounding the lower end of said hollow driving shaft and in engagement with said clips to thereby secure said clips to said shaft.

8. In a device of the class described and in combination with a vessel, a rotary outer impeller polygonal in form located adjacent the bottom of said vessel and comprising two horizontally arranged members spaced apart from one another and the periphery of which impeller moves in close proximity with the wall of said vessel, a rotary inner impeller comprising a disk located within said outer impeller, a vertically arranged driving shaft operatively connected with said inner impeller, a tubular shaft surrounding and spaced apart from said driving shaft and operatively connected with said outer impeller, the upper end of said shaft being open to the atmosphere and lower end thereof being in open communication with the interior of said outer impeller, and means for rotating said shafts.

9. In a device of the character described, in combination with a vessel, an outer impeller in the said vessel, an inner impeller inside the outer impeller, shafts for the impellers, respectively, driving means for rotating said impellers, said outer impeller comprising an upper member and a lower member, each of said members being composed of a plane disk with parts bent toward the other member and engaging said parts of the other member said inner impeller consisting of a plane disk, a shaft on which said inner impeller is secured, a tubular shaft engaging with the upper member of the outer impeller, means for rotating the respective shaft.

10. In a device of the character described, in combination with a vessel, an outer impeller in the said vessel, an inner impeller inside the outer impeller, an inner shaft on which the inner impeller is mounted, an outer shaft with which the outer impeller rotates, pulleys on the respective shafts, a driving wheel, a single belt having two strands passing around the driving wheel, each one of said strands passing around one of the pulleys of the aforesaid shafts whereby each shaft is driven by said driving wheel independently of the other shaft, and whereby said inner and outer impellers are driven independently of each other.

11. In a device of the character described, in combination with a vessel, an outer impeller in said vessel, an inner shaft, a tubular shaft surrounding the inner shaft, and detachably engaging with said outer impeller, an inner impeller inside the outer impeller, means securing said inner impeller to said inner shaft, a hollow shaft surrounding said inner shaft near the top of said tubular shaft, clips having grooved parts flanking said hollow shaft, clamping means on said grooved parts to engage said hollow shaft, said tubular shaft having recesses in its sides near its top, and said clips extending across the top of said tubular shaft and engaging in said recesses, whereby said tubular shaft is detachably connected with said hollow shaft to rotate therewith, and means for rotating said inner shaft and said hollow shaft independently of each other.

12. In a device of the character described, in combination with a vessel, an outer impeller comprising upper and lower parts engaging with each other, the upper member having an aperture, a tubular shaft detachably engaging the upper member around the aperture, an inner impeller between the upper and lower members of the outer impeller, an inner shaft extending down through said tubular shaft in the aperture in the upper member, means attaching said inner impeller to said inner shaft to rotate therewith, means on the lower end of said inner shaft holding said lower member up on said inner shaft to rotate independently of said inner shaft, said tubular shaft having recesses in its walls at opposite sides near its top, a wheel shaft surrounding said inner shaft near the top of said tubular shaft, clips having curved parts flanking said wheel shaft, means clamping said curved parts to said wheel shaft, said clips extending across the top of said tubular shaft and engaging in said recesses, whereby the tubular shaft and said outer impeller are caused to rotate with the wheel shaft, means for rotating said wheel shaft and said inner shaft independently of each other.

13. In a device of the character described, in combination with a vessel, an impeller mounted for rotation therein and adapted to travel within a composite substance contained in the vessel, rotatable means for drawing the composite substance centrally of the impeller and discharging the same peripherally of the impeller as and for the purpose set forth.

14. In a device of the character described, in combination with a vessel, a hollow impeller mounted for rotation within the vessel, a rotatable means mounted within the hollow impeller to draw the cream elements and air within the impeller and to discharge the same at the periphery of the impeller.

15. In a device of the character described, the combination with a vessel, a hollow impeller, a tubular shaft connected to said impeller driving the same and permitting air to enter within the impeller, the impeller being adapted to rotate within the cream elements contained in the vessel, the said impeller having perforations whereby the cream elements may enter within the impeller and mix with the incoming air therein, a rotary member provided with perforations therein arranged within the impeller and adapted to travel at a greater speed than that of the impeller, whereby they mix with the air contained within the impeller and subsequently cause the mixture of cream elements and air to be discharged from the periphery of the impeller.

16. In a device of the character described, in combination with a vessel, a plurality of impellers in the vessel, shafts for said impellers respectively, a bracket bearing on the vessel and supporting said shafts, and impellers for rotation, pulleys on the respective shafts, an arm extending down from the bracket outside the vessel, means on the arm to clamp it to supporting means to hold the bracket on the vessel and hold the vessel to the supporting means, a driving wheel rotatably mounted on the arm, a plurality of strands passing around the driving wheel, each one of said strands passing around one of the pulleys of the aforesaid shaft and an idle pulley rotatably mounted near where the arm meets the bracket, over which said strands pass.

ALPHEUS FAY.

Witnesses:
CARL E. JOHNSON,
H. D. JOHNSON.

Copies of this patent may be obtained for five cents each, by addressing the "Commissioner of Patents, Washington, D. C."